(12) United States Patent
Ikeda

(10) Patent No.: US 6,913,108 B2
(45) Date of Patent: Jul. 5, 2005

(54) ELECTRIC POWER STEERING APPARATUS

(75) Inventor: Riichiro Ikeda, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/002,008

(22) Filed: Dec. 5, 2001

(65) Prior Publication Data

US 2002/0070618 A1 Jun. 13, 2002

(30) Foreign Application Priority Data

Dec. 8, 2000 (JP) ........................................ 2000-375173

(51) Int. Cl.⁷ .............................. B62D 1/11; B62D 5/04
(52) U.S. Cl. ......................... 180/444; 280/777; 74/493
(58) Field of Search ............................... 180/443, 444, 180/274, 400; 280/777; 79/493

(56) References Cited

U.S. PATENT DOCUMENTS

| | | | | |
|---|---|---|---|---|
| 5,511,823 A | * | 4/1996 | Yamaguchi et al. | 280/777 |
| 5,953,961 A | * | 9/1999 | Stuedemann et al. | 74/492 |
| 6,006,854 A | * | 12/1999 | Nakajima | 180/446 |
| 6,019,391 A | * | 2/2000 | Stuedemann et al. | 280/779 |
| 6,389,924 B1 | * | 5/2002 | Ryne et al. | 74/493 |
| 6,431,601 B2 | * | 8/2002 | Maekawa | 280/777 |
| 2002/0066333 A1 | * | 6/2002 | Ryne et al. | 74/493 |

FOREIGN PATENT DOCUMENTS

JP         2001-180506       * 3/2001

* cited by examiner

Primary Examiner—Paul N. Dickson
Assistant Examiner—George D Spisich
(74) Attorney, Agent, or Firm—Birch, Stewart, Kolasch & Birch, LLP

(57) ABSTRACT

In the electric power steering apparatus, a supporting mechanism for supporting a steering assist motor on a stationary member comprises: a projection provided at one end of a motor housing; a recess provided at the stationary member, into which said projection is inserted; a movement permitting portion for permitting relative movement of the projection in the recess; and a slip-off portion from where the projection slips off said movement permitting portion. When impact energy of a primary crash and/or a secondary crash is applied to the motor housing, support of the motor on the stationary member is automatically released by rotating said motor housing.

14 Claims, 11 Drawing Sheets

ELECTRIC POWER STEERING APPARATUS

BACKGROUND OF THE INVENTION

1. Field of the invention

The present invention relates to an electric power steering apparatus using a motor as a generation source of steering assistance force.

2. Description of Related Art

FIG. 1 is a front view showing a constitution of a conventional electric power steering apparatus.

As shown in FIG. 1, for example, an electric power steering apparatus for a vehicle comprises: a steering shaft 101 joined to a steering wheel 100 for steering; a shaft housing 102 for accommodating said steering shaft 101; a steering assist motor 104 for assisting operation of a steering mechanism joined via a joint to the steering shaft 101, the steering assist motor 104 having a rotor arranged so that a rotational center thereof intersects an axis of the steering shaft 101 and a cylindrical motor housing 103 for supporting said rotor; fastening members 105 for supporting one end portion of the motor housing 103 on a lower end portion of the shaft housing 102; a lower mounting member 106 for mounting a lower end portion of the shaft housing 102 to a car body (see FIG. 2); and an upper mounting member 108 for mounting an axially middle portion of the shaft housing 102 to the car body 109, the upper mounting member 108 having an impact energy absorber 107 for absorbing impact energy of a secondary crash.

The steering shaft 101 is divided into an upper shaft 101a joined to the steering wheel 100 and a lower shaft 101b joined to the joint, the divided end portions being connected to each other by an impact energy absorber for absorbing impact energy of a secondary crash. The shaft housing 102 is divided into an upper shaft housing 102a to which the upper mounting member 108 is mounted and a lower shaft housing 102b to which the motor 104 and the lower mounting member 106 are mounted, the divided end portions being engaged with each other so as to be movable relatively.

FIG. 2 is a schematic representation showing a state of a conventional electric power steering apparatus mounted to a car body.

The electric power steering apparatus constituted as above is disposed in a passenger's room. As shown in FIG. 2, the lower mounting member 106 and the upper mounting member 108 are mounted to the car body 109. The joint 110, which connects the steering shaft 101 and the steering mechanism of the electric power steering apparatus mounted to the car body 109, is disposed through an instrument panel 111 of the car body 109.

When a vehicle having an electric power steering apparatus mounted thereto as above makes a crash, such as a frontal crash, the instrument panel 111 of the car body 109 is occasionally transformed toward the interior of the passenger's room by the crash (a primary crash). When a driver crashes (a secondary crash) into the steering wheel 100 by the action of a shock of a primary crash, impact energy is applied to the upper steering shaft 101a, and further to the upper shaft housing 102a via said upper steering shaft 101a. Since the upper steering shaft 101a and the upper shaft housing 102a are pressured in an axial direction in this case, the impact energy absorber of the steering shaft 101 and the impact energy absorber 107 of the upper mounting member 108 are destroyed, and the upper steering shaft 101a and the upper shaft housing 102a move relatively with the lower steering shaft 101b and the lower shaft housing 102b. The impact energy of the secondary crash can thus be absorbed.

However, the steering assist motor 104 of the electric power steering apparatus which is constituted as the above projects outward in a radial direction of the shaft housing 102 on a relatively large scale. Moreover, said motor 104 is fixed to the lower shaft housing 102b with fastening members 105. At the time of the secondary crash, a driver's leg occasionally strikes against the motor 104 since the upper shaft housing 102a moves relatively with the upper shaft housing 102b to which the motor 104 is mounted. Consequently, there arises a problem in that driver's damage becomes serious. Moreover, when the instrument panel 111 or the like of the car body 109 strikes against the motor 104 at the time of the primary crash, transformation of the instrument panel 111 or the like is hindered by the motor 104, thereby preventing absorption of impact energy.

BRIEF SUMMARY OF THE INVENTION

The present invention has been made with the aim of solving the above problems, and one object of the invention is to provide an electric power steering apparatus in which a supporting mechanism for supporting a steering assist motor on a stationary member has a releasing mechanism for releasing support of the motor on the stationary member by impact energy applied to the motor, with which support of the motor is automatically released when impact energy is applied to the motor.

Another object of the present invention is to provide an electric power steering apparatus in which the supporting mechanism comprises a projection and a recess into which said projection is inserted and the releasing mechanism comprises a movement permitting portion for permitting relative movement of the projection in the recess and a slip-off portion from where the projection slips off said movement permitting portion, with which the projection can move from the recess to the movement permitting portion, and further outward from the slip-off portion when impact energy is applied to the motor, thereby releasing support of the motor on the stationary member preferably.

Another object of the present invention is to provide an electric power steering apparatus in which the releasing mechanism has an elastic body for pushing the projection or the recess portion outward at the position of the slip-off portion, with which the projection or the recess portion is pushed outward by the elastic body.

A further object of the present invention is to provide an electric power steering apparatus in which the projection is configured as a screw member and the recess is configured as a through bore, with which the motor can be supported in a manner that the support can be released, utilizing an existing motor supporting structure having fastening members.

Another object of the present invention is to provide an electric power steering apparatus in which an impact energy receiver for applying rotational force to the motor housing by the impact energy is provided at a peripheral face of the cylindrical motor housing which is arranged to intersect an axis of a steering shaft, with which impact energy can be suitably applied to the impact energy receiver and the motor housing can be rotated preferably.

A further object of the present invention is to provide an electric power steering apparatus in which a supporting mechanism for supporting a cylindrical motor housing on a shaft housing comprises at least one projection provided at a peripheral position of the motor housing, at least one arc-shaped groove provided at the shaft housing, into which groove the projection is inserted so as to be movable in a longitudinal direction, and at least one slip-off portion from where the projection slips off the arc-shaped groove when the projection moves, with which the projection can move from the recess to the movement permitting portion, and further outward from the slip-off portion when impact energy is applied to the motor, thereby automatically releasing support of the motor on the stationary member.

The electric power steering apparatus according to an embodiment of the present invention comprises a steering assist motor for assisting operation of a steering mechanism by turning a steering member and a supporting mechanism for supporting said motor on a stationary member, the supporting mechanism having a releasing mechanism for releasing support of the motor on the stationary member by impact energy applied to the motor. Consequently, when impact energy of a primary crash and/or a secondary crash is applied to the motor, support of the motor on the stationary member can be automatically released, impact energy of a primary crash can be absorbed preferably, and driver's damage caused by a secondary crash can be reduced.

In the electric power steering apparatus, the supporting mechanism comprises a projection provided at one of the motor and the stationary member and a recess provided at the other of the motor and the stationary member, the projection being inserted into the recess. Moreover, the releasing mechanism comprises a movement permitting portion for permitting relative movement of the projection in the recess and a slip-off portion from where the projection slips off the movement permitting portion. The motor can be supported on the stationary member by inserting the projection into the recess. In this supporting state, the projection provided at the motor or at the stationary member moves in the recess to the movement permitting portion, and further outward from the slip-off portion when impact energy of a primary crash and/or a secondary crash is applied to the motor. Support of the motor on the stationary member can thus be released preferably.

In the electric power steering apparatus, the releasing mechanism further has an elastic body for pushing the projection or the recess portion, which is provided at the motor, outward at the position of the slip-off portion. Consequently, when the projection provided at the motor or at the stationary member moves along the movement permitting portion to the position of the slip-off portion in the recess, the elastic body pushes the projection or the recess portion outward, thus releasing support of the motor on the stationary member nimbly.

In the electric power steering apparatus, the projection is configured as a screw member and the recess is configured as a through bore. Since the motor is supported in a manner that the support can be released utilizing an existing motor supporting structure having fastening members, costs can be relatively reduced.

In the electric power steering apparatus, the motor has a rotor arranged so that a rotational center thereof intersects an axis of the steering shaft joined to the steering member and a cylindrical motor housing for supporting said rotor, and a peripheral face of the motor housing is provided with an impact energy receiver for applying rotational force to the motor housing by the impact energy. Consequently, impact energy of a primary crash and/or a secondary crash can be suitably applied to the impact energy receiver. Since the motor housing can be rotated preferably, support of the motor on the stationary member can released more preferably.

The electric power steering apparatus according to another embodiment of the present invention comprises: a steering shaft joined to a steering member; a shaft housing for accommodating said steering shaft; a steering assist motor for assisting operation of a steering mechanism joined to the steering shaft, the steering assist motor having a rotor arranged so that a rotational center thereof intersects an axis of the steering shaft and a cylindrical motor housing for supporting said rotor; and a supporting mechanism for supporting one end portion of the motor housing on the shaft housing, the supporting mechanism further comprising: at least one projection provided at a peripheral position of the motor housing; at least one arc-shaped groove provided at the shaft housing, into which groove the projection is inserted so as to be movable in a longitudinal direction; and at least one slip-off portion from where the projection slips off the arc-shaped groove when the projection moves. The motor can be supported on the shaft housing by inserting the projection into the arc-shaped groove of the shaft housing. In this supporting state, a projection provided at the motor housing can move in an arc-shaped groove, and further outward from a slip-off portion when impact energy of a primary crash and/or a secondary crash is applied to the motor housing. Support of the motor housing on the shaft housing can thus be automatically released.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

Embodiment 1

Figure 3:
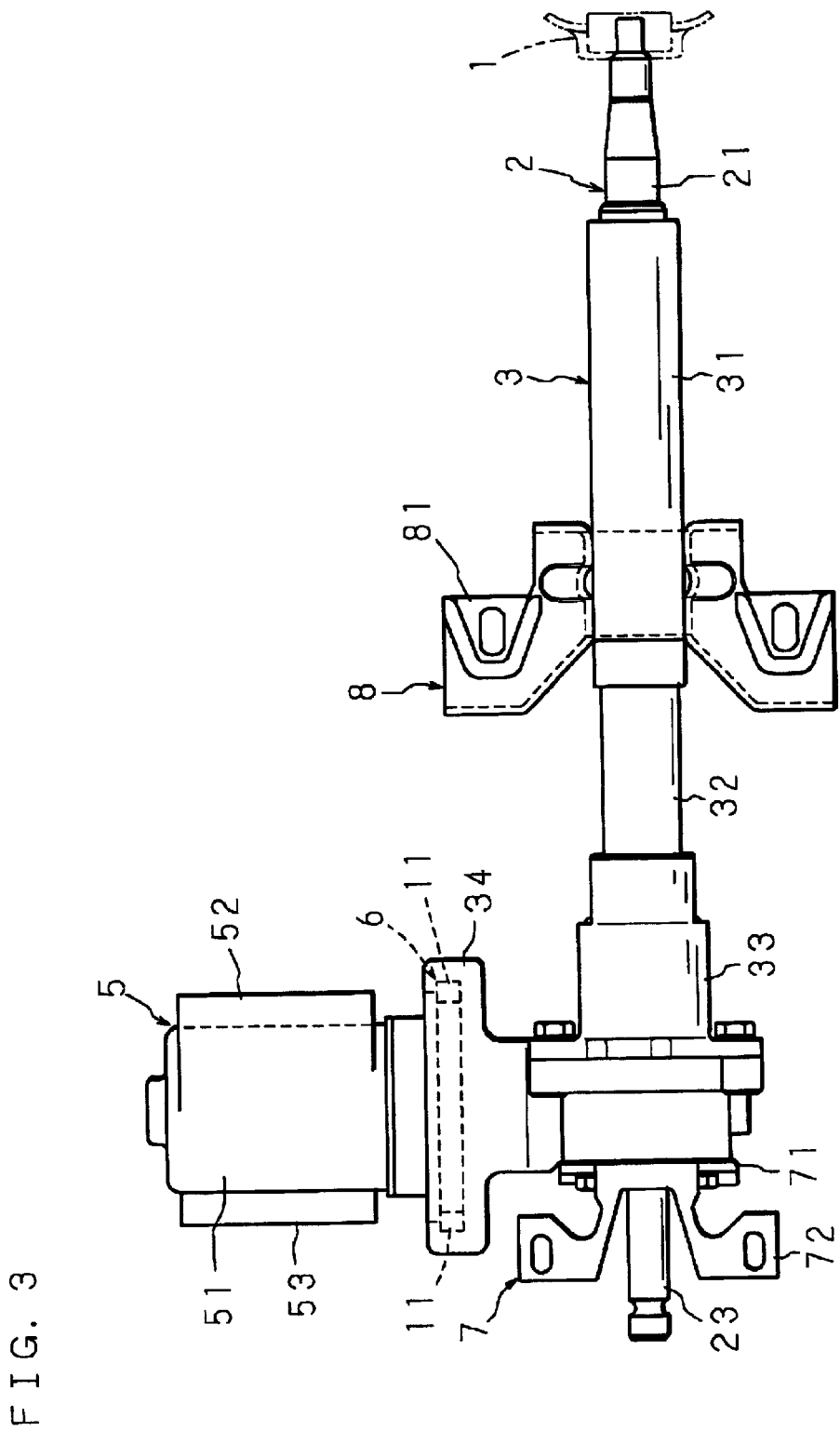
FIG. 3 is a front view showing a constitution of an electric power steering apparatus according to the present invention.
Figure 4:
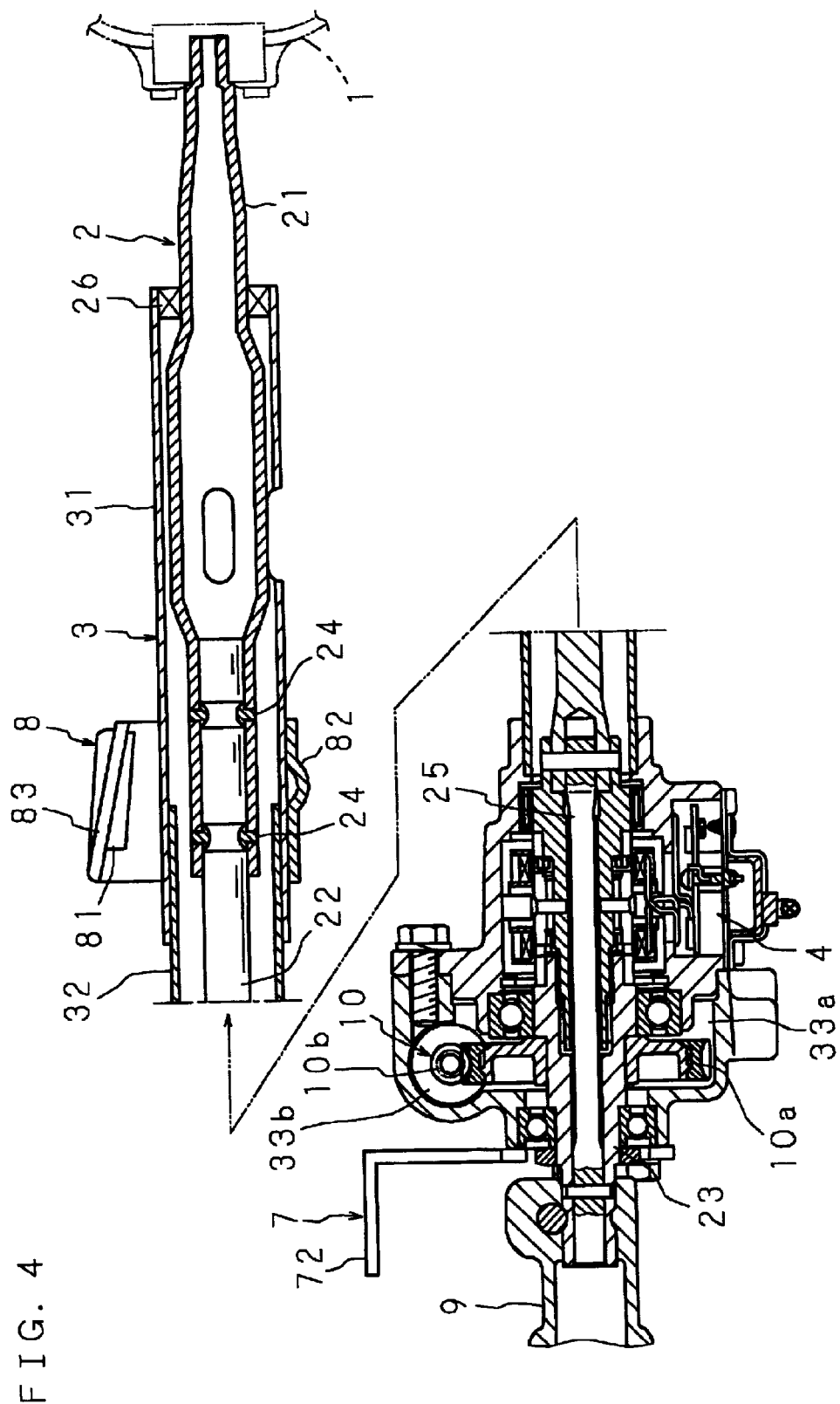
FIG. 4 is a sectional view showing a constitution of an electric power steering apparatus according to the present invention.

FIG. 3 is a front view showing a constitution of an electric power steering apparatus according to the present invention, and FIG. 4 is a sectional view showing a constitution of the electric power steering apparatus.

As shown in FIG. 3 and FIG. 4, the electric power steering apparatus comprises: a steering shaft 2 joined to a steering wheel 1 for steering; a shaft housing 3 for supporting and accommodating said steering shaft 2; a torque sensor 4 for detecting steering torque applied to the steering wheel 1; a steering assist motor 5 driven based on a result of the detection of the torque sensor 4, the steering assist motor 5 having a rotor 54 (see FIG. 7 and FIG. 9) arranged so that a rotational center thereof intersects an axis of the steering shaft 2 and a cylindrical motor housing 51 for supporting said rotor 54; a supporting mechanism 6 for supporting one end portion of the motor housing 51 on a lower end portion of the shaft housing 3; a lower mounting member 7 for mounting a lower end portion of the shaft housing 3 to a car body; and an upper mounting member 8 for mounting an axially middle portion of the shaft housing 3 to the car body, the upper mounting member 8 having an impact energy absorber 81 for absorbing impact energy of a secondary crash. The apparatus is constituted so that operation of a steering mechanism joined via a joint 9 to a lower end of the steering shaft 2 is assisted by rotation of the motor 5, thereby reducing driver's load for steering.

The steering shaft 2 comprises a first shaft 21 joined to the steering wheel 1, a second shaft 22 connected to a lower end portion of the first shaft 21 via an impact energy absorber 24 made of synthetic resin for absorbing impact energy applied to the steering wheel 1 by a driver, and a third shaft 23 connected to a lower end portion of said second shaft 22 via a torsion bar 25. Said third shaft 23 is joined via a reduction gear mechanism 10 to the rotor 54 of the motor 5. A lower end of the third shaft 23 is joined via a joint 9 to a steering mechanism. The torque sensor 4 is adapted to detect steering torque by relative rotational displacement of the second shaft 22 and the third shaft 23.

The shaft housing 3 comprises a cylindrical first shaft housing 31 for supporting and accommodating the first shaft 21; a cylindrical second shaft housing 32 for accommodating the second shaft 22, the second shaft housing 32 being engaged into a lower end portion of the first shaft housing 31 so as to be movable relatively; and a third shaft housing 33 having a first receiver 33a for accommodating the torque sensor 4 and a driven gear 10a of the reduction gear mechanism 10, the third shaft housing 33 being fitted to a lower end portion of the second shaft housing 32. The lower mounting member 7 is mounted at a lower end of said third shaft housing 33.

Figure 5:
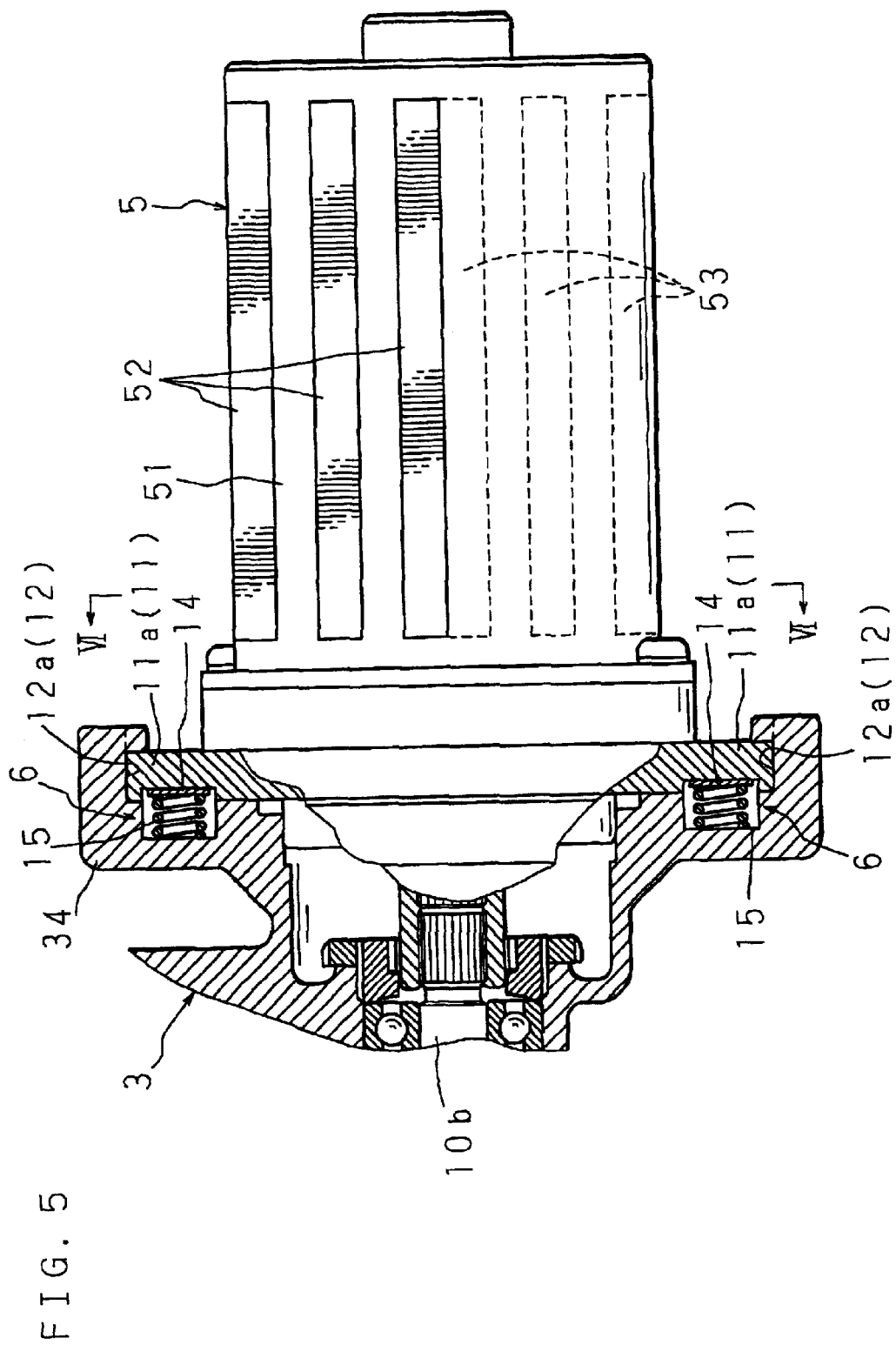
FIG. 5 is a partly sectional front view of a motor portion of an electric power steering apparatus according to the present invention.

FIG. 5 is a partly sectional front view of a motor portion.

The third shaft housing 33 is provided with a substantially cylinder-shaped second receiver 33b for accommodating a driving gear 10b of the reduction gear mechanism 10 and a ring-shaped motor supporting portion 34 for supporting the motor housing 51. The second receiver 33b is coupled to one side of the first receiver 33a, and the motor supporting portion 34 is provided at one end side of said second receiver 33b.

At the motor supporting portion 34 the motor housing 51 is supported by the supporting mechanism 6 so as to be angularly rotatable. The motor 5 is arranged to intersect an axis of the steering shaft 2, supported by the motor housing 51. In this arrangement of the motor 5, said motor 5 projects outward in a radial direction of the shaft housing 3 on a relatively large scale. Consequently, the motor 5 suitably strikes against an instrument panel or the like of a car body at the time of a primary crash.

Figure 6:
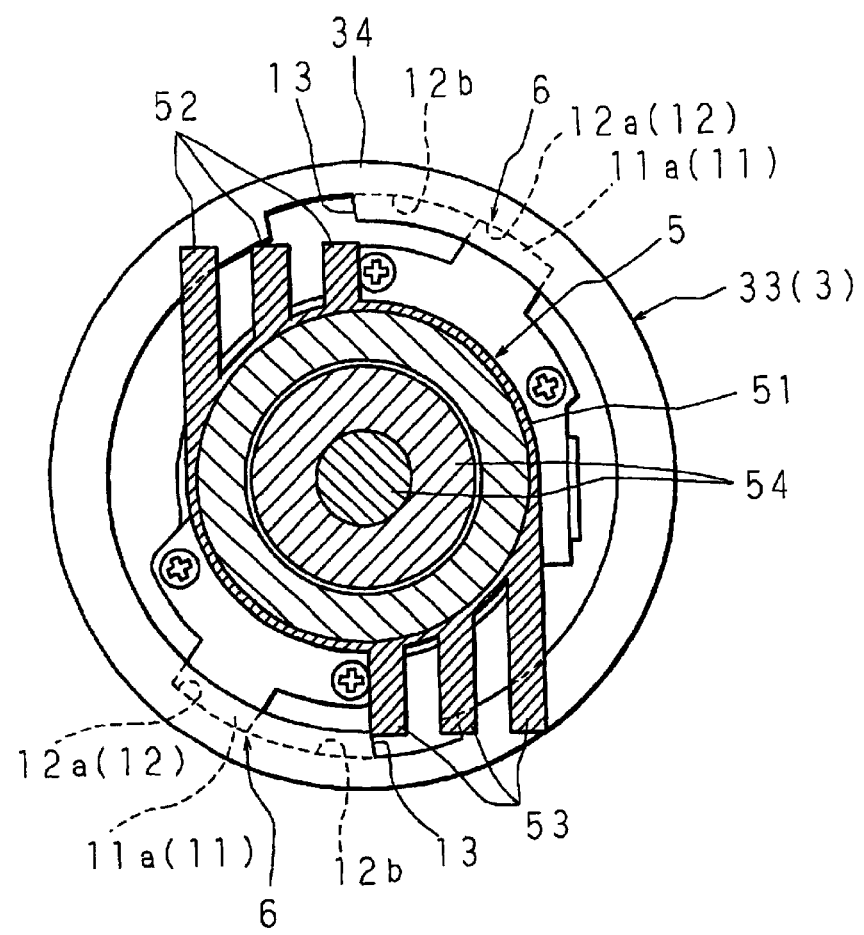
FIG. 6 is a sectional view taken along the line VI—VI of FIG. 5.

FIG. 6 is a sectional view taken along the line VI—VI of FIG. 5.

A peripheral face of the motor housing 51 of the motor 5 is provided with upper and lower impact energy receivers 52 and 53 for applying rotational force to said motor housing 51 when impact energy of a primary crash and/or a secondary crash is applied to the motor 5, particularly to the motor housing 51.

Said impact energy receivers 52 and 53 are formed by arranging a plurality of ribs at diagonal positions with regard to a rotational center of the rotor 54 on faces, which are supposed to be upper and lower faces of the motor 5 when the electric power steering apparatus is mounted to the car body. Though the impact energy receivers 52 and 53 are formed to cover the total length of the motor housing 51 in this embodiment, the impact energy receivers 52 and 53 may be formed only at a part in an axial direction of the motor housing 51, and moreover, may be configured so that a plurality of rib portions are provided throughout the motor housing 51.

The supporting mechanism 6 comprises two tongues 11a configured as projections 11 provided at peripheral positions of the motor housing 51, two arc-shaped grooves 12a configured as recesses 12 which are provided in an arc shape within the motor supporting portion 34 and into which the tongues 11a are inserted so as to be movable in a longitudinal direction thereof, and two slip-off portions 13 from where said tongues 11a slip off the arc-shaped grooves 12a when the tongues 11a move with angular rotation of the motor housing 51.

Though two tongues 11a are provided at a peripheral face of one end portion of the motor housing 51 with equal phase difference in this embodiment, one tongue 11a or more than two tongues 11a may be provided.

An arc-shaped groove 12a is formed to cover an angle of approximately 45° eccentrically to the motor supporting portion 34. One longitudinally end portion of the arc-shaped groove 12a constitutes a supporting mechanism 6 for supporting the motor 5 in engagement with a tongue 11a. The other end side excepting the supporting mechanism 6 constitutes a movement permitting portion 12b for permitting relative movement of the tongue 11a. The movement permitting portion 12b and the slip-off portion 13 provided at the other longitudinally end portion of the arc-shaped groove 12a constitute a releasing mechanism for releasing support of the motor 5 by impact energy applied to the motor 5.

Within the arc-shaped groove 12a, a thin arc-shaped contact plate 14 made of a material with relatively low frictional resistance, such as synthetic resin, and an elastic body 15 consisting of a coiled spring for pushing said contact plate 14 against one face of the tongue 11a are provided. Said elastic body 15 prevents the tongue 11a from trembling in the arc-shaped groove 12a. The contact plate 4 can reduce frictional resistance caused when the tongue 11a moves. The tongue 11a can thus move preferably.

The slip-off portion 13 is formed by cutting one side wall of one end of the arc-shaped groove 12a off in accordance with a form of the tongue 11a. With angular rotation of the motor housing 51, the tongue 11a slips outward from the slip-off portion 13 when the tongue 11a moves to one end of the arc-shaped groove 12a.

The lower mounting member 7 has a first mounting portion 71 mounted to a lower end portion of the third shaft housing 33 and a second mounting portion 72 mounted to the car body.

The upper mounting member 8 comprises a first mounting portion 82 mounted to the first shaft housing 31, a second mounting portion 83 mounted to the car body, and an impact energy absorber 81 made of synthetic resin for connecting the first mounting portion 82 and the second mounting portion 83.

Figure 1:
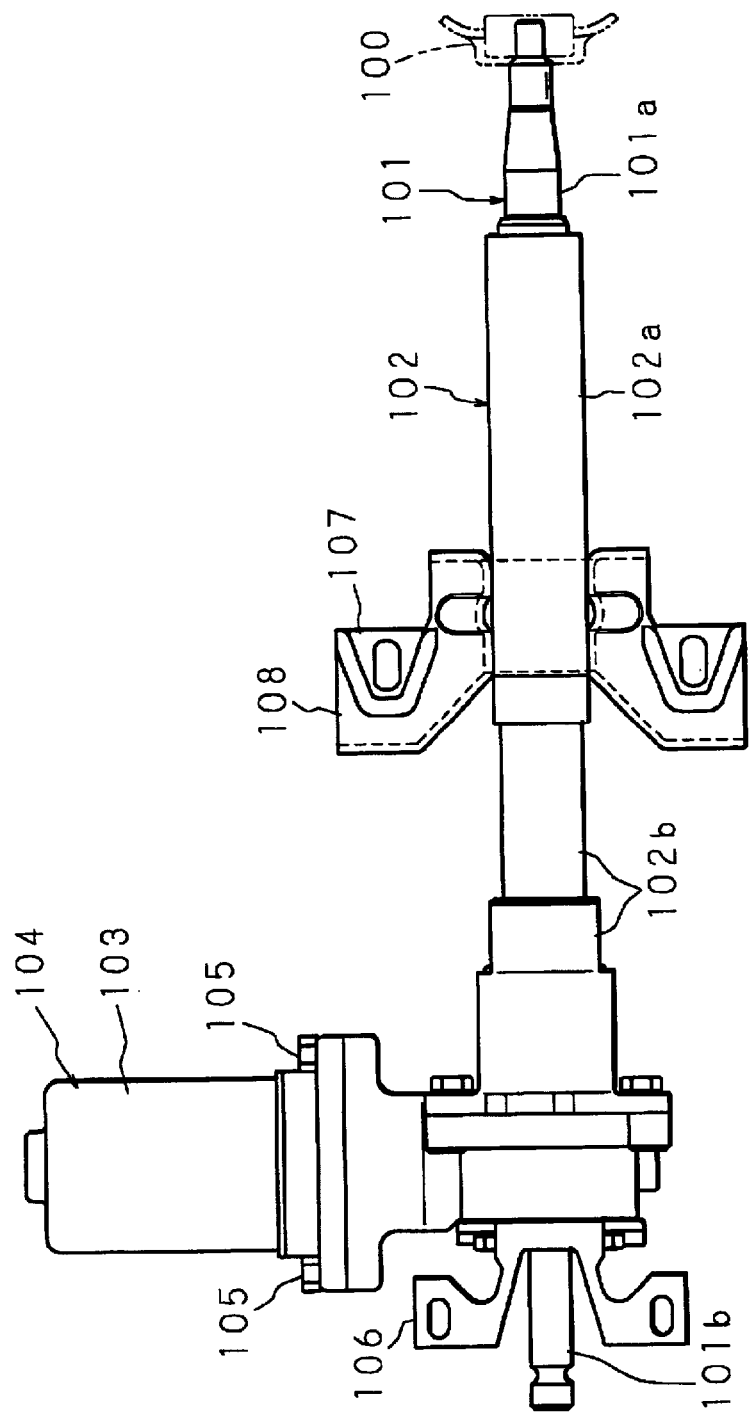
FIG. 1 is a front view showing a constitution of a conventional electric power steering apparatus.
Figure 2:
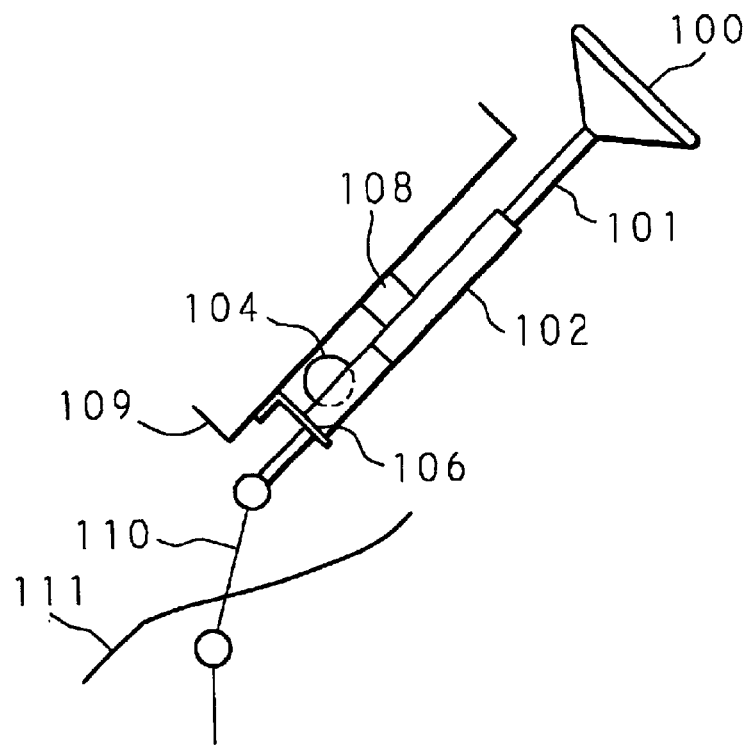
FIG. 2 is a schematic representation showing a state of a conventional electric power steering apparatus mounted to a car body.

The electric power steering apparatus constituted as above is disposed in a passenger's room and the second mounting portion 72 of the lower mounting member 7 is mounted to the car body with bolts in the same way as the conventional power steering apparatus shown in FIG. 2. The third shaft housing 33 is supported on the car body. The second mounting portion 82 of the upper mounting member 8 is fixed to the car body with bolts. Moreover, the first shaft housing 31 is mounted to the car body via the upper mounting member 8. In the electric power steering apparatus mounted to the car body, a joint 9 connecting the steering shaft 2 and the steering mechanism is disposed through an instrument panel of the car body.

When the instrument panel or the like of the car body is transformed toward the interior of a passenger's room by a frontal crash or the like (a primary crash) of a vehicle, the transformed portion of the instrument panel or the like occasionally strikes against the motor 5. In such a case, since a peripheral face of the motor housing 51 is provided with the upper and lower impact energy receivers 52 and 53, the transformed portion of the instrument panel or the like strikes against a lower impact energy receiver 53 for example, thereby allowing impact energy to be applied to said lower impact energy receiver 53.

Figure 7:
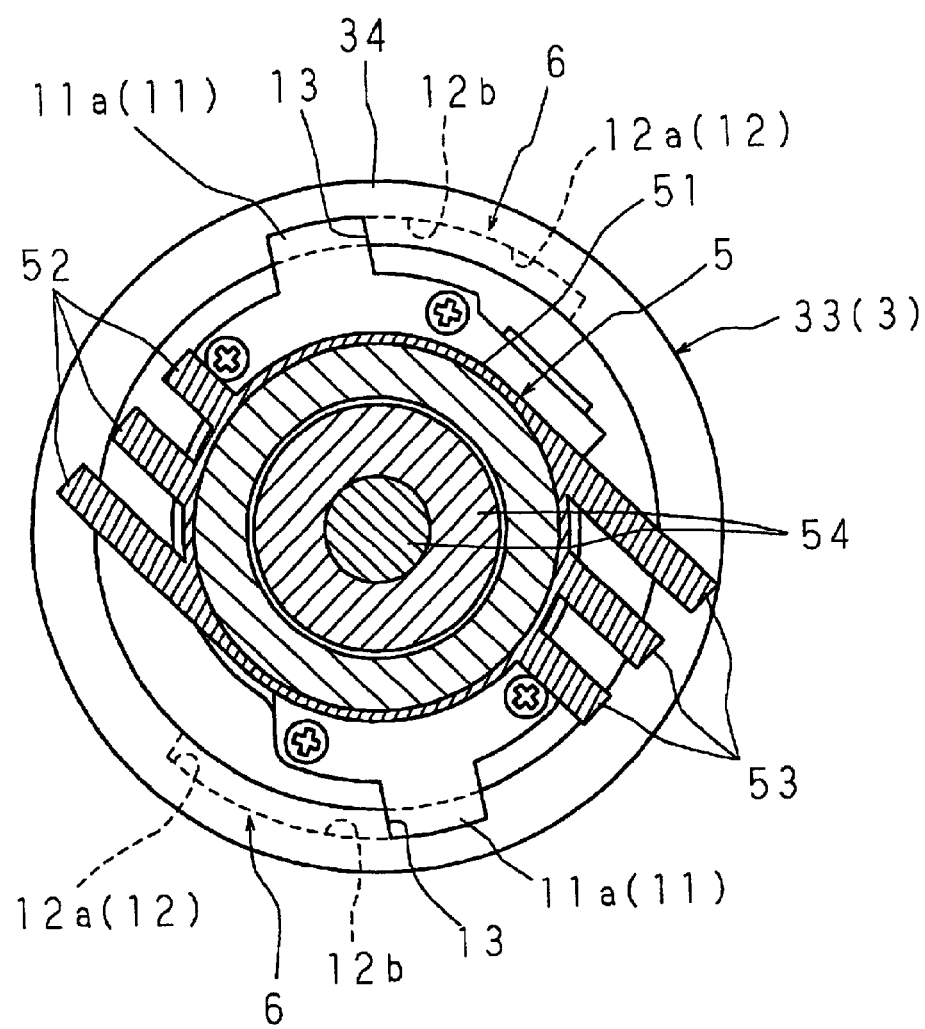
FIG. 7 is a representation illustrating a state of a motor of an electric power steering apparatus according to the present invention when support of the motor is released.

FIG. 7 is a representation illustrating a state of a motor when support of the motor is released.

Since the upper and lower impact energy receivers 52 and 53 are provided at diagonal positions with regard to a rotational center of the rotor 54, rotational force in a counterclockwise direction of FIG. 6 is applied to the motor housing 51 by impact energy applied to the lower impact energy receiver 53. With rotation of the motor housing 51 caused by this rotational force, the tongue 11a of the motor housing 51 moves in the arc-shaped groove 12a of the shaft housing 3 to the movement permitting portion 12b, and further to the slip-off portion 13 (see FIG. 7), and slips outward from said slip-off portion 13. Thus, support of the motor 5 on the third shaft housing 33 is automatically released. Consequently, a transformed portion of an instrument panel or the like which has struck against the motor 5 by a primary crash can be further transformed, thereby allowing impact energy of a primary crash to be absorbed preferably.

Moreover, when a driver crashes (a secondary crash) into the steering wheel 1 by the action of a shock of the primary crash and impact energy thereof is applied to the first shaft housing 31 via the first shaft 21 and a ball bearing 26, the first shaft 21 and the first shaft housing 31 are pressured in an axial direction, the impact energy absorber 24 of the steering shaft 2 and the impact energy absorber 81 of the upper mounting member 8 are destroyed, and the first shaft 21 and the first shaft housing 31 move relatively with the second shaft 22 and the second shaft housing 32. Impact energy of the secondary crash can thus be absorbed.

When a driver crashes into the steering wheel 1 by the action of a shock of a primary crash as mentioned above, a driver's leg occasionally strikes against the motor 5. In such a case, since a peripheral face of the motor housing 51 is provided with the upper impact energy receiver 52, a driver's leg strikes against the upper impact energy receiver 52 for example, thereby allowing impact energy to be applied to the upper impact energy receiver 52.

Since the upper and lower impact energy receivers 52 and 53 are provided at diagonal positions with regard to a rotational center of the rotor 54, rotational force in a counterclockwise direction of FIG. 6 is applied to the motor housing 51 by impact energy applied to the upper impact energy receiver 52. With rotation of said motor housing 51 caused by this rotational force, the tongue 11a of the motor housing 51 moves in the arc-shaped groove 12a of the shaft housing 3 to the movement permitting portion 12b, and further to the slip-off portion 13 (see FIG. 7), and slips outward from said slip-off portion 13. Support of the motor 5 on the third shaft housing 33 is thus automatically released. Consequently, driver's damage caused by a second crash can be reduced.

Within arc-shaped groove 12a a contact plate 14 is provided to reduce frictional resistance caused when the tongue 11a moves along the movement permitting portion 12b. Consequently, the motor housing 51 provided with the tongue 11a can be angularly rotated preferably. Further, since the contact plate 14 in the arc-shaped groove 12a is pushed against one face of the tongue 11a by the elastic body 15, the tongue 11a is prevented from trembling in the arc-shaped groove 12a.

Though a coiled spring is used as an elastic body 15 in a releasing mechanism in the above embodiment, synthetic rubber or a leaf spring may be employed instead of a coiled spring. When a leaf spring is used, an apparatus without the contact plate 14 may be constituted by disposing the leaf spring at a slant with regard to one side of the arc-shaped groove 12a so that the leaf spring contacts with one face of the tongue 11a.

Embodiment 2

Figure 8:
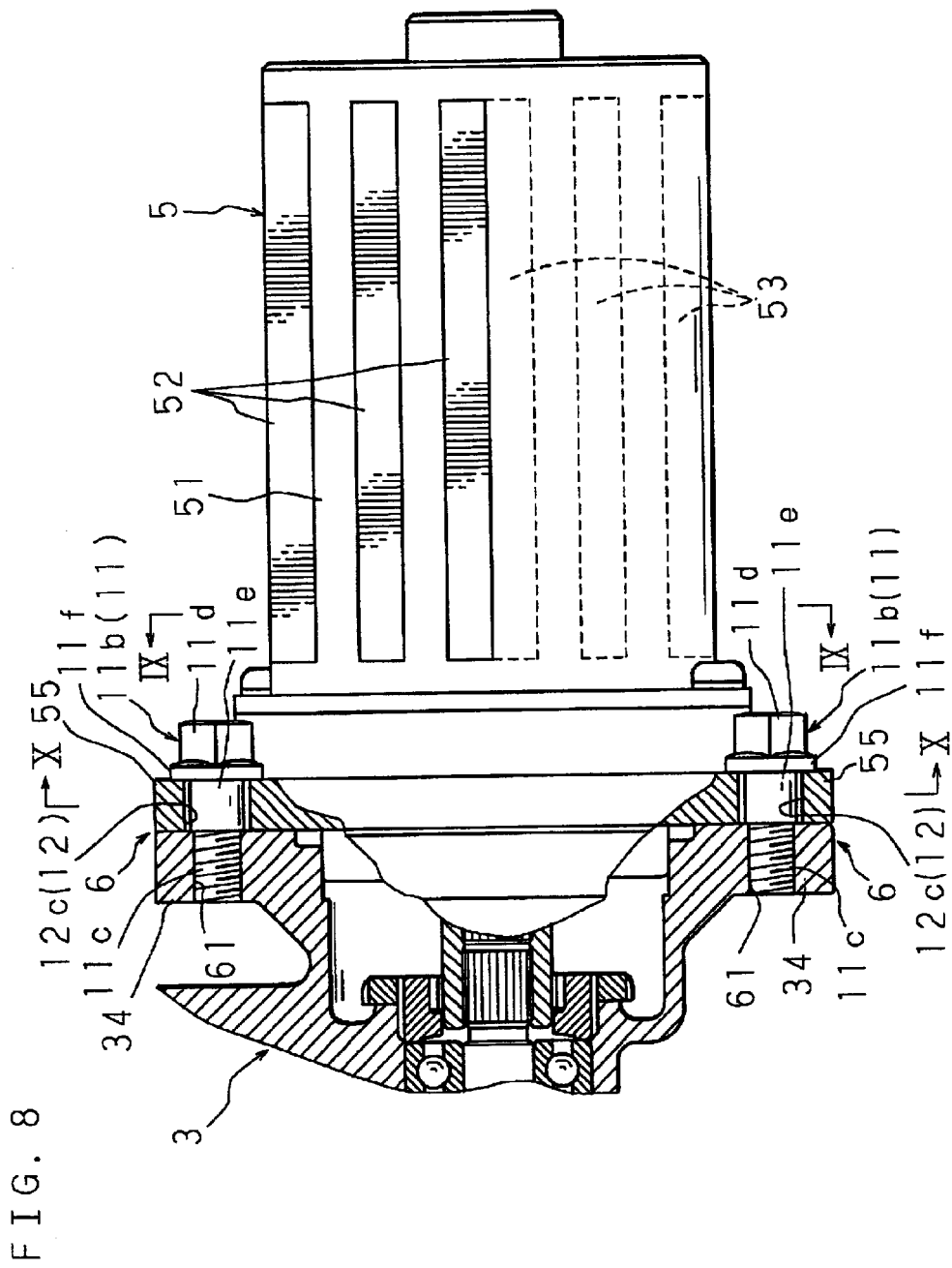
FIG. 8 is a partly sectional front view of a motor portion showing a constitution of Embodiment 2 of an electric power steering apparatus according to the present invention.
Figure 9:
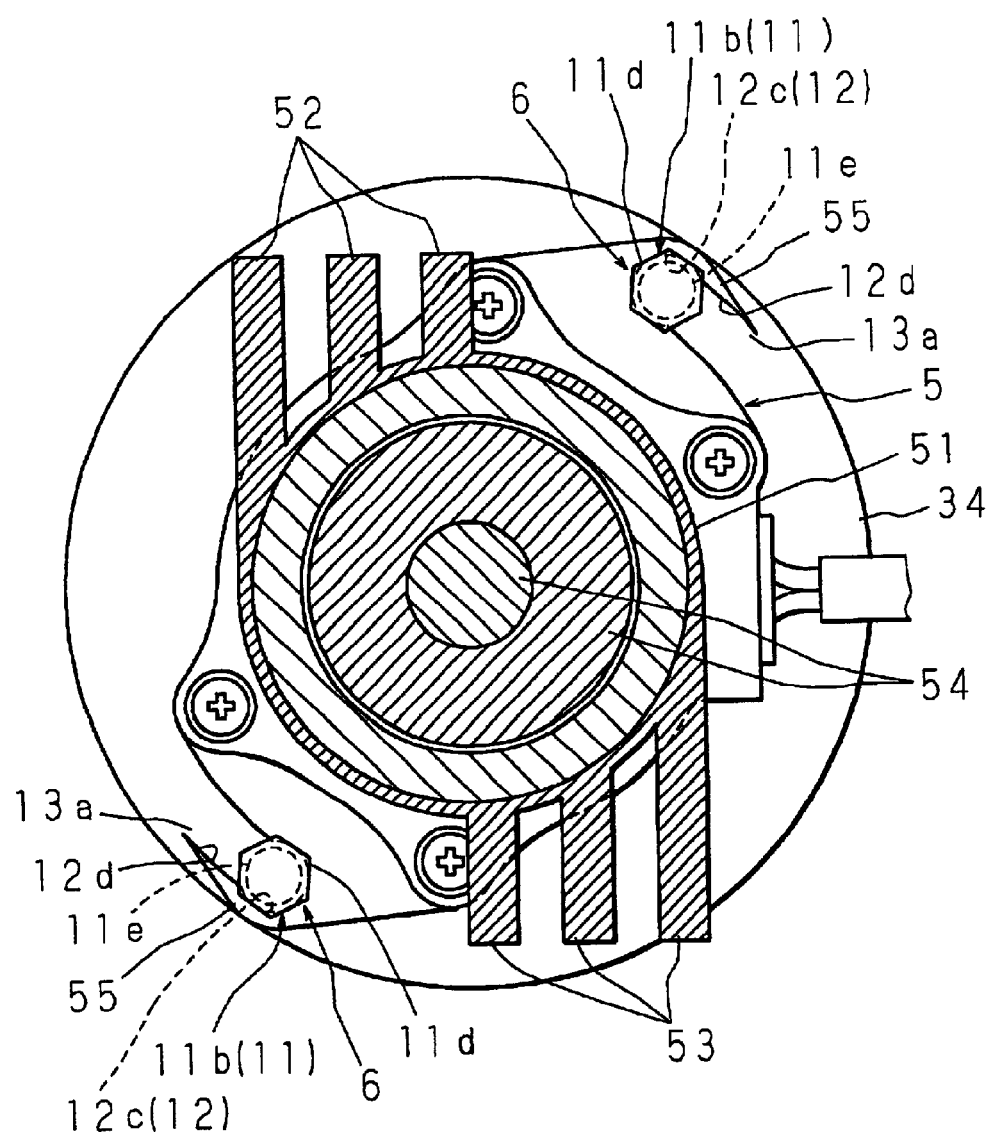
FIG. 9 is a sectional view taken along the line IX—IX of FIG. 8.
Figure 10:
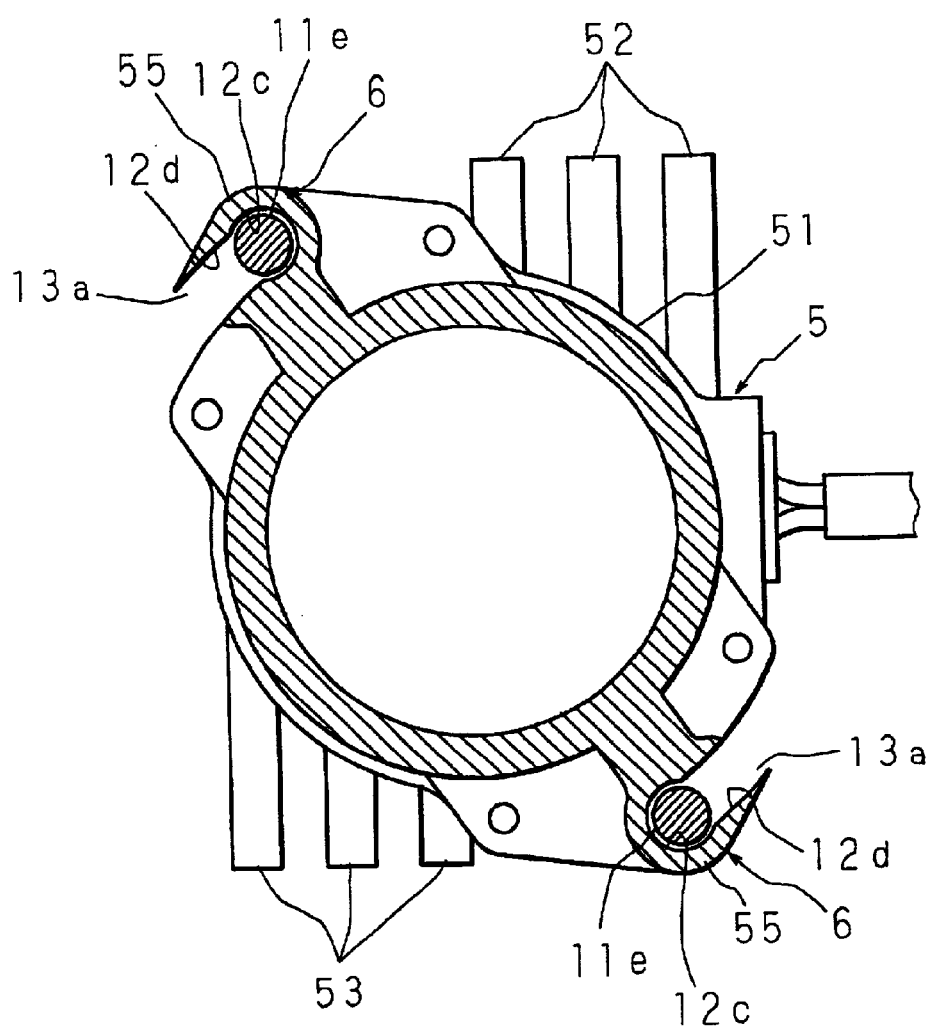
FIG. 10 is a sectional view taken along the line X—X of FIG. 8, in which an interior portion of the motor is omitted.
Figure 11:
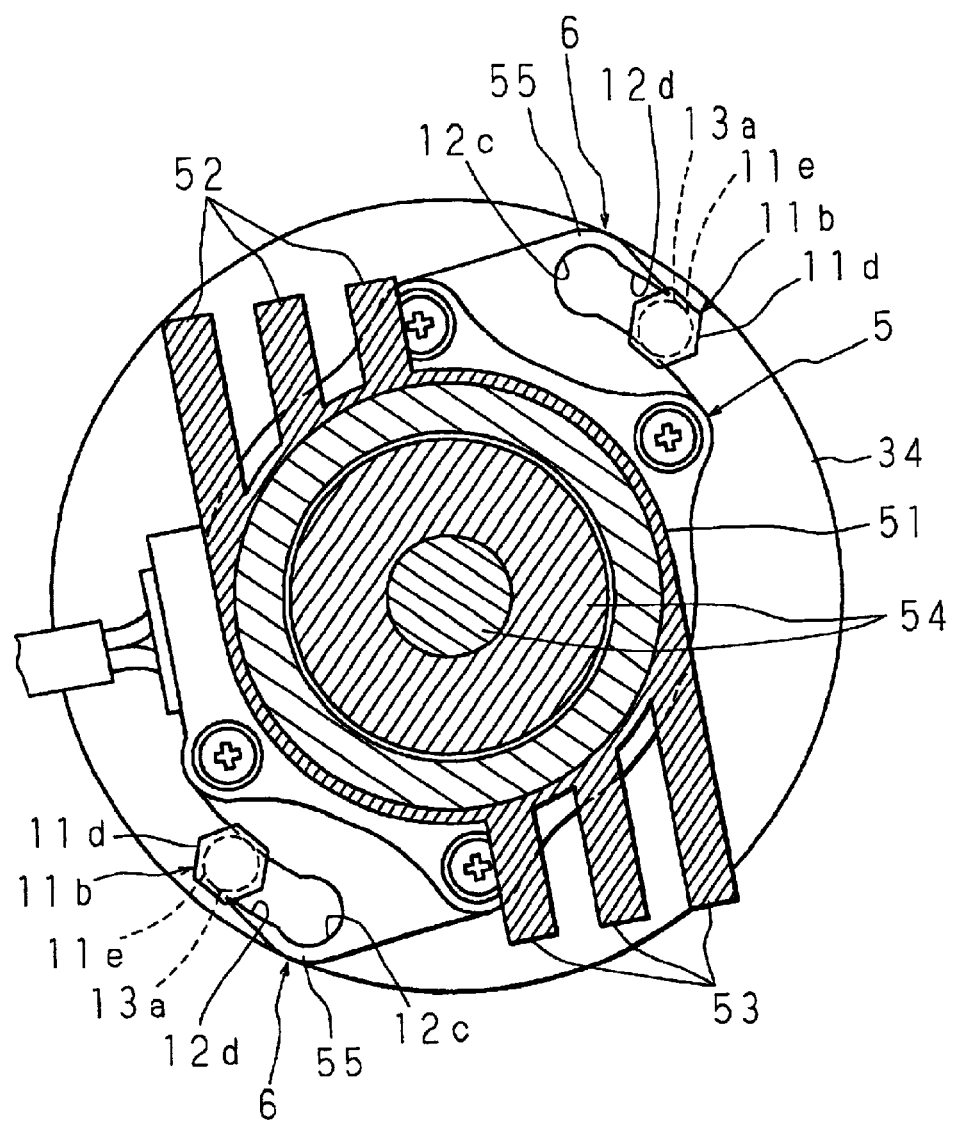
FIG. 11 is a presentation illustrating a state of a motor of Embodiment 2 of an electric power steering apparatus according to the present invention when support of the motor is released.

FIG. 8 is a partly sectional front view of a motor portion showing a constitution of Embodiment 2 of an electric power steering apparatus according to the present invention; FIG. 9 is a sectional view taken along the line IX—IX of FIG. 8; FIG. 10 is a sectional view taken along the line X—X of FIG. 8, in which an interior portion of the motor is omitted; and FIG. 11 is a presentation illustrating a state of a motor when support of the motor is released.

In the electric power steering apparatus of this embodiment, the projection 11 for supporting the motor 5 on the shaft housing 3 is configured as a screw member 11b and the recess 12 is configured as a through bore 12c into which the screw member 11b is inserted.

In this embodiment, two threaded holes 61 are provided at the ring-shaped motor supporting portion 34, which is provided at one end side of the second receiver 33b of the third shaft housing 33, with equal phase difference in a peripheral direction. A screw member 11b is screwed into said threaded hole 61.

The screw member 11b is configured as a bolt which has a non-thread portion 11e with larger diameter than a thread portion 11c and a slip-off preventing portion 11f with larger diameter than said non-thread portion 11e and the through bore 12c between a thread portion 11c at one end side and a rotation operating portion 1d at the other end side. In a state where the thread portion 11c is screwed into the threaded hole 61, the non-thread portion 11e, the slip-off preventing portion 11f and the rotation operating portion 11d are exposed to the exterior of the motor supporting portion 34.

Two mounting tongues 55 are provided at one end portion of the motor housing 51 having the impact energy receivers 52 and 53, more particularly at positions facing the screw members 11b, in a radial direction. At said mounting tongues 55 the through bores 12c are provided. The non-thread portion 11e of the screw member 11b is inserted into the through bore 12c so as to be movable relatively.

One side of the through bore 12c is left open in an arc shape, a center of which is the rotor 54. In said open portion a releasing mechanism is constituted which has a movement permitting portion 12d for permitting relative movement of the screw member 11b in the through bore 12c and a slip-off portion 13a from where the screw member 11b slips off said movement permitting portion 12d. Though two pairs of screw members 11b and through bores 12c are arranged at regular intervals in this embodiment, one pair of screw member 11b and through bore 12c or more than two pairs of screw members 11b and through bores 12c may be arranged.

In Embodiment 2, when impact energy is applied to the lower impact energy receiver 53 of the motor 5 by a primary crash as mentioned in Embodiment 1, rotational force in a counterclockwise direction of FIG. 9 is applied to the motor housing 51 by said impact energy. With rotation of said motor housing 51 caused by this rotational force, the mounting tongue 55 (the through bore 12c portion) of the motor housing 51 moves away from the screw member 11b of the motor supporting portion 34, and the through bore 12c moves along the movement permitting portion 12d and slips off the screw member 11b at the position of the slip-off portion 13. Support of the motor 5 on the third shaft housing 33 is thus automatically released. Consequently, a transformed portion of an instrument panel or the like which has struck against the motor by a primary crash can be further transformed, thereby allowing impact energy of the primary crash to be absorbed preferably.

Moreover, when impact energy is applied to the upper impact energy receiver 52 of the motor 5 by a secondary crash as mentioned in Embodiment 1, rotational force in a counterclockwise direction of FIG. 9 is applied to the motor housing 51 by said impact energy. With rotation of said motor housing 51 caused by this rotational force, the mounting tongue 55 (the through bore 12c portion) of the motor housing 51 moves away from the screw member 11b of the motor supporting portion 34, and the through bore 12c moves along the movement permitting portion 12d and slips off the screw member 11b at the position of the slip-off portion 13. Support of the motor 5 on the third shaft housing 33 is thus automatically released. Consequently, driver's damage caused by a secondary crash can be reduced.

In Embodiment 2, since other structures and functions are the same as those of Embodiment 1, like codes are used to refer to like parts and detailed explanation thereof are omitted.

In the above embodiment, the impact energy receivers 52 and 53 are provided at diagonal positions with regard to a rotational center of the rotor 54 on faces which are supposed to be upper and lower faces of the motor housing 51 of the motor 5 when the electric power steering apparatus is mounted to the car body. However, one impact energy receiver 52 or 53 may be provided at one of the upper and lower faces of the motor housing 51 of the motor 5 at said position. Moreover, impact energy receivers 52 and 53 may be provided at both sides with regard to the rotational center of the rotor 54 on an upper face and/or a lower face of the motor 51 of the motor at said position.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:

a steering assist motor for assisting operation of a steering mechanism by turning a steering member; and a supporting mechanism for supporting said motor on a stationary member comprising a projection provided at one of the motor and the stationary member and a recess provided at the other of the motor and the stationary member, the projection being inserted into the recess;

wherein the supporting mechanism has a releasing mechanism for releasing support of the motor on the stationary member by impact energy applied to the motor comprising a movement permitting portion for permitting relative movement of the projection in the recess and a slip-off portion from where the projection slips off the movement permitting portion and an elastic member for pushing the projection provided at one of the motor and the stationary member outward at a position of the slip-off portion.

2. An electric power steering apparatus, comprising:

a steering assist motor for assisting operation of a steering mechanism by turning a steering member; and a supporting mechanism for supporting said motor on a stationary member comprising a projection provided at one of the motor and the stationary member and a recess provided at the other of the motor and the stationary member, the projection being inserted into the recess;

wherein the supporting mechanism has a releasing mechanism for releasing support of the motor on the stationary member by impact energy applied to the motor comprising a movement permitting portion for permitting relative movement of the projection in the recess and a slip-off portion from where the projection slips off the movement permitting portion, an elastic member for pushing the projection being provided at one of the motor and the stationary member outward at a position of the slip-off portion; and wherein the motor has a rotor arranged so that a rotational center thereof intersects an axis of a steering shaft joined to the steering member and a cylindrical motor housing for supporting said rotor, and a peripheral face of said motor housing is provided with an impact energy receiver for applying rotational force to the motor housing by the impact energy.

3. An electric power steering apparatus, comprising:

a steering assist motor for assisting operation of a steering mechanism by turning a steering member; and a supporting mechanism for supporting said motor on a stationary member comprising a projection configured as a screw member provided at one of the motor and the stationary member and a recess configured as a through bore provided at the other of the motor and the stationary member, the projection being inserted into the recess;

wherein the supporting mechanism has a releasing mechanism for releasing support of the motor on the stationary member by impact energy applied to the motor comprising a movement permitting portion for permitting relative movement of the projection in the recess and a slip-off portion from where the projection slips off the movement permitting portion, and the motor has a rotor arranged so that a rotational center thereof intersects an axis of a steering shaft joined to the steering member and a cylindrical motor housing for supporting said rotor, and a peripheral face of said motor housing is provided with an impact energy receiver for applying rotational force to the motor housing by the impact energy.

4. An electric power steering apparatus, comprising:

a steering assist motor for assisting operation of a steering mechanism by turning a steering member; and a supporting mechanism for supporting said motor on a stationary member comprising a projection provided at one of the motor and the stationary member and a recess provided at the other of the motor and the stationary member, the projection being inserted into the recess;

wherein the supporting mechanism has a releasing mechanism for releasing support of the motor on the stationary member by impact energy applied to the motor comprising a movement permitting portion for permitting relative movement of the projection in the recess and a slip-off portion from where the projection slips off the movement permitting portion and wherein the motor has a rotor arranged so that a rotational center thereof intersects an axis of a steering shaft joined to the steering member and a cylindrical motor housing for supporting said rotor, and a peripheral face of said motor housing is provided with an impact energy receiver for applying rotational force to the motor housing by the impact energy.

5. An electric power steering apparatus, comprising:

a steering assist motor for assisting operation of a steering mechanism by turning a steering member; and a supporting mechanism for supporting said motor on a stationary member, wherein the supporting mechanism has a releasing mechanism for releasing support of the motor on the stationary member by impact energy applied to the motor, and the motor has a rotor arranged so that a rotational center thereof intersects an axis of a steering shaft joined to the steering member and a cylindrical motor housing for supporting said rotor, and a peripheral face of said motor housing is provided with an impact energy receiver for applying rotational force to the motor housing by the impact energy.

6. An electric power steering apparatus, comprising:

a steering shaft joined to a steering member;

a shaft housing with an opening for accommodating said steering shaft;

a steering assist motor for assisting operation of a steering mechanism joined to the steering shaft, the steering assist motor having a rotor arranged so that a rotational center thereof intersects an axis of the steering shaft and a cylindrical motor housing for supporting said rotor; and a supporting mechanism for supporting one end portion of the motor housing on the shaft housing, wherein the supporting mechanism comprises:

a projection provided at a peripheral position of the motor housing;

an arc-shaped groove provided in the shaft housing, the arc-shaped groove being open to the interior of the shaft housing opening and having a discontinuity into which the projection is inserted so as to be movable in a length direction of the groove; and a slip-off portion from where the projection slips off the arc-shaped groove when the projection moves.

7. The electric power steering apparatus of claim 6, wherein the arc-shaped groove of the supporting mechanism is configured as a recess within the supporting mechanism.

8. An electric power steering apparatus according to claim 6, wherein the supporting mechanism comprises an elastic member for pushing the projection at the arc-shaped groove outward at the slip-off portion.

9. An electric power steering apparatus according to claim 6 wherein a peripheral face of said motor housing is provided with an impact energy receiver for applying rotational force to the motor housing by the impact energy.

10. An electric power steering apparatus according to claim 6 wherein the supporting mechanism comprises an arc-shaped contact plate made of a material with low frictional resistance within the arc-shaped groove.

11. An electric power steering apparatus, comprising:

a steering assist motor for assisting operation of a steering mechanism by turning a steering member; and a supporting mechanism for supporting said motor on a stationary member comprising a projection configured as a tongue provided at one of the motor and the stationary member and a recess configured as an annular groove provided at the other of the motor and the stationary member, the projection being inserted into the recess;

wherein the supporting mechanism has a releasing mechanism for releasing support of the motor on the stationary member by impact energy applied to the motor comprising a movement permitting portion for permitting relative movement of the projection in the recess and a slip-off portion from where the projection slips off the movement permitting portion, and the motor has a rotor arranged so that a rotational center thereof intersects an axis of a steering shaft joined to the steering member and a cylindrical motor housing for supporting said rotor, and a peripheral face of said motor housing is provided with an impact energy receiver for applying rotational force to the motor housing by the impact energy.

12. An electric power steering apparatus, comprising:

a steering assist motor for assisting operation of a steering mechanism by turning a steering member; and a supporting mechanism for supporting said motor on a stationary member comprising a projection provided at one of the motor and the stationary member and a recess provided at the other of the motor and the stationary member, the projection being inserted into the recess;

wherein the supporting mechanism has a releasing mechanism for releasing support of the motor on the stationary member by impact energy applied to the motor comprising a movement permitting portion for permitting relative movement of the projection in the recess, a slip-off portion from where the projection slips off the movement permitting portion and an elastic member for pushing the projection provided at one of the motor and the stationary member outward at a position of the slip-off portion, the projection being configured as a tongue and the recess being configured as an annular groove.

13. An electric power steering apparatus, comprising:

a steering assist motor for assisting operation of a steering mechanism by turning a steering member; and a supporting mechanism for supporting said motor on a stationary member comprising a projection configured as a tongue provided at one of the motor and the stationary member and a recess configured as an annular groove provided at the other of the motor and the stationary member, the projection being inserted into the recess;

wherein the supporting mechanism has a releasing mechanism for releasing support of the motor on the stationary member by impact energy applied to the motor comprising a movement permitting portion for permitting relative movement of the projection in the recess, a slip-off portion from where the projection slips off the movement permitting portion and an elastic member for pushing the projection provided at one of the motor and the stationary member outward at a position of the slip-off portion, and the motor has a rotor arranged so that a rotational center thereof intersects an axis of a steering shaft joined to the steering member and a cylindrical motor housing for supporting said rotor, and a peripheral face of said motor housing is provided with an impact energy receiver for applying rotational force to the motor housing by the impact energy.

14. An electric power steering apparatus, comprising:

a support; and a steering assist motor for assisting operation of a steering mechanism by turning a steering member mounted on said support, said motor having a rotor having a rotational center intersecting an axis of a steering shaft joined to the steering member and a motor housing for supporting said rotor;

said steering assist motor having a peripheral face provided with at least one projection for applying rotational force to the motor housing upon the application of impact energy against the at least one projection.

* * * * *